Nov. 3, 1925.

M. T. DENNE 1,559,680

ROTARY KNIFE OR CUTTER

Filed Oct. 30, 1920    2 Sheets-Sheet 1

INVENTOR
Mark Thomas Denne
by Heard Smith & Tennant.
Attys.

Nov. 3, 1925. 1,559,680
M. T. DENNE
ROTARY KNIFE OR CUTTER
Filed Oct. 30, 1920   2 Sheets-Sheet 2
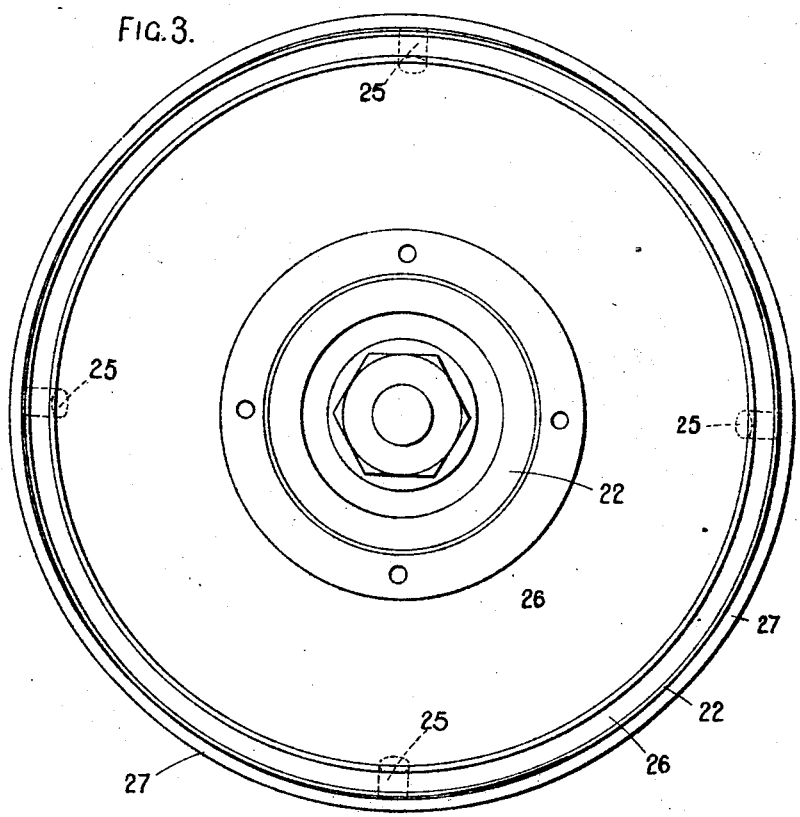
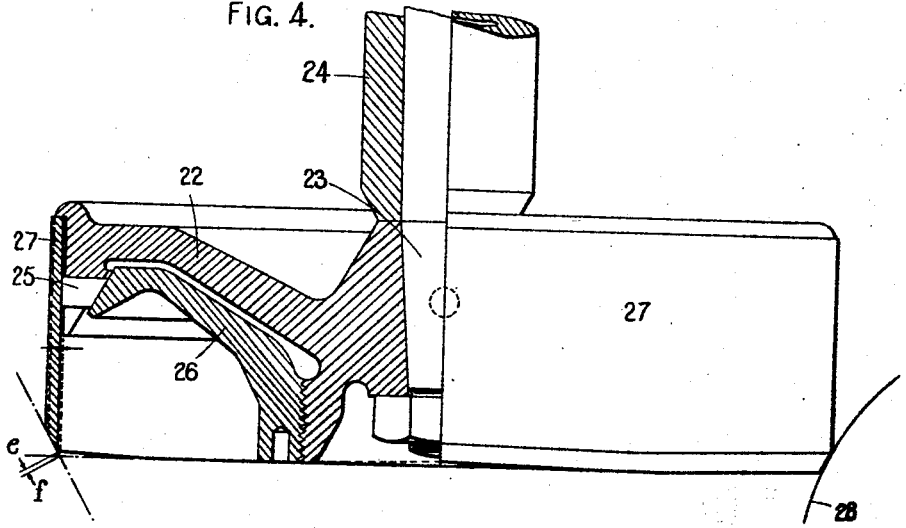
INVENTOR
Mark Thomas Denne Patented Nov. 3, 1925.

1,559,680

UNITED STATES PATENT OFFICE.

MARK THOMAS DENNE, OF WARLINGHAM, ENGLAND.

ROTARY KNIFE OR CUTTER.

Application filed October 30, 1920. Serial No. 420,783.

*To all whom it may concern:*

Be it known that I, MARK THOMAS DENNE, a subject of the King of Great Britain, residing at Edgehill, Warlingham, in the county of Surrey, England, have invented new and useful Improvements in and Relating to Rotary Knives or Cutters, of which the following is a specification.

This invention has reference to improvements in and relating to rotary knives or cutters.

Rotary cutters having a continuous cutting edge and which are used, inter alia, in inseam trimming machines, often burn the leather or other material if the cutter is rotated at a reasonably high speed, and various attempts have been made to obviate this. For example the knife body or blank has been made with a number of gaps so that a corresponding number of comparatively narrow cutters or short cutting edges are produced. This expedient not only fails—so far as my experience goes— to attain the desired result (because, possibly, the whole of all the cutting edges are still in the same plane of rotation), but it introduces another very serious defect, in that the sides of the comparatively narrow cutters—except at the very extreme edge—are obviously of more or less considerable thickness, so that, if the work be fed forward even moderately fast, the blunt side of each cutter chops or cleaves into the work thereby setting up much vibration in addition to preventing the obtaining of a clean cut.

I have referred to the cutters in use in inseam trimming machines only because large numbers of these are in use, and their defects are well known, but the application of my invention is not limited to the production of cutters for such machines.

The object of my invention is to produce a cutter whereby a clean cut may be made even when the work is fed forward comparatively quite fast; which cutter will avoid undue heating and will not set up vibration in the machine or at any rate not to the extent that has been the case heretofore.

It is usually essential to provide machines having rotary cutters with a suitably mounted grinding disc which can, from time to time, be brought up to the bevel of the cutting edge whilst the cutter is rotating, to maintain a sharp edge whilst the machine is in actual use, and my improved cutter or knife is so made that it can be maintained sharp in that manner.

My improved cutter is formed with what I term a sinuous cutting edge; that is to say in the case of a disc cutter, made in accordance with my invention, adjacent parts of the cutting edge will be at different distances from the axis of the cutter; and in the case of cylindrical or hoop knives or in the case of "dished" knives, adjacent parts of the cutting edge will be located in different planes of rotation. In other words my invention consists in a knife or cutter in which the cutting edge gradually alternately advances towards and recedes from the part of the material at the time being operated on as relative feed movement is imparted to the work and the cutter, so that a succession of slicing cuts are made.

In the drawings,

Fig. 3 is a front elevation of a cylindrical cutter made in accordance with my invention.

Fig. 4 is a side elevation partly in section of said cylindrical cutter.

Figure 1:
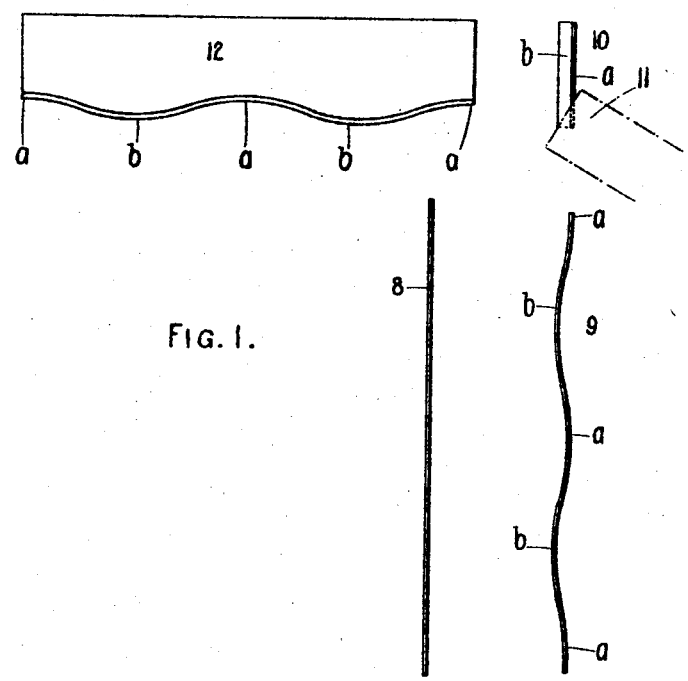
Fig. 1 shows a strip of metal in the several stages of its manufacture whereby the undulating cutting edge is produced.

A simple method whereby my improved knife or cutter may be made will be readily understood with the aid of Fig. 1 of the accompanying drawings.

In this the numeral 8 indicates the edge view of a strip of steel which is to have a sinuous cutting edge formed on it. I firstly deform the strip, for example by corrugating it as shown at 9, and thereafter grind one edge to form a cutting edge. An end view of the deformed or corrugated strip is shown at 10. (It is to be assumed for the purpose of this description that the strip is so stiff that it will maintain its shape or form in every direction whilst it is being operated on.)

It will be seen on referring to the views 9 and 10, that when the grinding wheel 11 first contacts with the blank as this is moved by suitable guiding means across the wheel, the parts *a* (which form the relatively highest parts of the undulations or corrugations) will be ground away and as the grinding continues the parts *a* will be more and more ground away (further and further back from the original edge) together with a continually increasing part of the blank on each side of the parts *a*, until, when a cutting edge has been ground on the parts *b* (which forms the relatively lowest parts of the undulations or corrugations) there will be a continuous cutting edge along the edge of the blade and which cutting edge will be sinuous as shown at 12, which shows the corrugated blade laid down.

From the foregoing it will be obvious that the distance from centre to centre of the corrugations in the strip 9, will determine the distance from centre to centre of the successive curves forming the cutting edge shown at 12, and that the depth of said corrugations together with the particular angle the grinding disc makes with the blank as grinding is effected, will determine the depth of the curves in 12. It will be seen, therefore, that the cutting edge may have any degree of curvature by suitably modifying the conditions referred to and that the number of such curves in a given length may be almost any desired, from one upwards.

Figure 2:
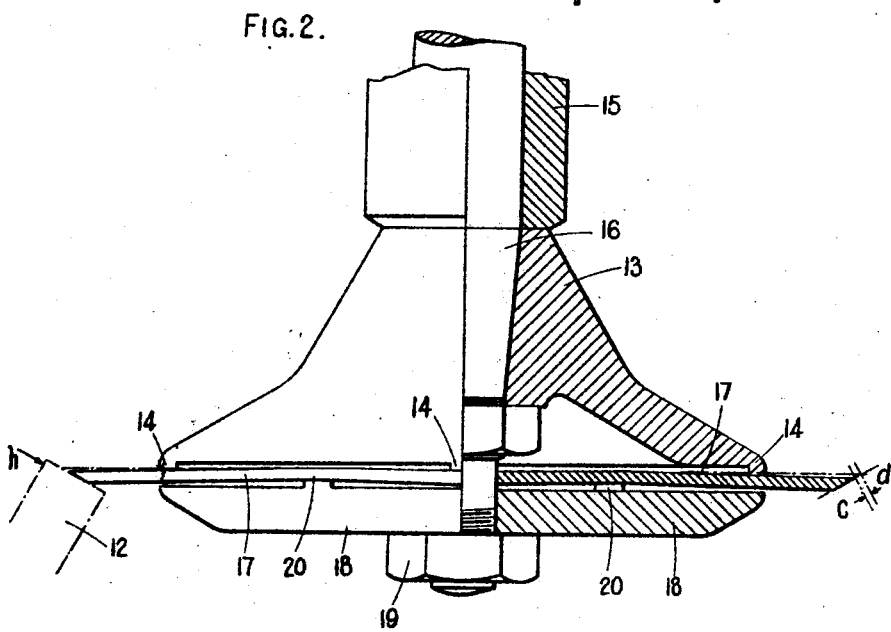
Fig. 2 is a side elevation partly in section of one form, viz, a disc form, of cutter made in accordance with my invention.

In Fig. 2 I show, by way of example, a rotary disc cutter having a sinuous cutting edge formed in accordance with my invention.

In said figure 13 indicates the body or main part of a holder which is fixed on a shaft 16 mounted in a suitable bearing 15. The lower face of the part 13 is circular and at its edge it has snags or snugs 14 projecting from its surface. In the example illustrated there are two diametrically opposite pairs of snags spaced equally apart. A cutter or knife blank 17 in the form of a disc is placed against the snags 14, the disc being maintained against lateral displacement by the end of the shaft 16 projecting through a central aperture in the disc 17. The disc is held up against the snags 14 by a plate 18 (having four snags 20 projecting from it) and nut 19.

The plate 18 is so positioned that the snags 20 thereon are located midway between the snags 14 on the body 13. If now the nut 19 be tightened up the snags 20 will press the disc 17 into the spaces between the snags 14 on the body 13 and similarly the snags 14 will press the disc 17 into the spaces between the snags 20 on the plate 18, the result of which will be that the disc is deformed by being formed with radial undulations or corrugations.

This having been effected the disc is rotated and a grinding disc, indicated at 12, is gradually brought up against it until a cutting edge is produced all around the disc 17. This cutting edge will be sinuous, as already described with reference to Fig. 1, and in the example illustrated the depth of the undulations of the sinuous cutting edge is shown between the arrows *c, d*, as will be readily understood.

The arrow *h* indicates the line of work feed.

In Figs. 3 and 4 I have illustrated, again by way of example, a cylindrical form of rotary cutter having a sinuous cutting edge formed on it in accordance with my invention. Fig. 3 is a front face view and Fig. 4 a side elevation partly in section.

In this case 22 is the body or main part of the carrier which is mounted on a shaft 23 supported in a bearing 24.

Adapted to be screwed on to the boss of the body 23 is a dished disc 26 the periphery of which is inclined or conical so as to engage against the correspondingly shaped ends of studs 25 that pass through apertures in the periphery of the body. Mounted on the body 22 is a hoop-blank 27 which is a loose fit thereon. If now the plate 26 be screwed up tight the studs 25 will force out, i. e. away from the periphery of the part 22, those parts of the hoop-blade against which said studs contact, whilst, owing to the tension thus put on the hoop blade, those parts of the latter located between adjacent studs 25 will be made to press tight against the periphery of 22. The hoop-blade is thus deformed or formed with undulations or corrugations.

If now the shaft be rotated and a grinding wheel indicated at 28 brought up against the edge of the hoop-blade a sinuous cutting edge will be produced the depth of the undulations of which edge will be, in the example illustrated, that indicated by the screws *e, f*.

In this construction of knife the arrow *m* indicates the direction of work feed.

It will be obvious that instead of grinding the outer front edge of the hoop the inner edge may be ground away to form a sinuous cutting edge.

If the view 12 in Fig. 1 be taken to be the development of a cylindrical knife it will be seen that the knife can be moved in either direction so that it may be possible to present a new cutting surface by merely reversing the rotation of the knife.

I wish it to be understood that I do not limit my invention to either of the constructional forms of cutters illustrated by way of example. Further, if the body of the cutter be thick enough it may suffice to press it into the desirable corrugated shape—say whilst hot—so that the cutter will maintain its shape without requiring the use of special cramping devices.

What I claim is:—

1. A rotary knife or cutter having a body provided with an annular cutting edge that is arranged to make a cut in a line at an acute angle to the axis of rotation, the portion of the body on which the cutting edge is formed being distorted in a direction transversely to the thickness thereof to form an undulating cutting edge of such a shape that it alternately advances progressively and recedes progressively in the direction of said line during the rotation of the cutter.

2. A rotary knife or cutter formed from a blank of sheet metal and having an annular cutting edge arranged to make a cut in a line at an angle to the axis of rotation, and a holder or support for said cutter constructed to apply pressure thereto at separated points and in a direction to produce deformations therein which extend to the cutting edge and which produce a cutting edge which alternately advances progressively and recedes progressively in said line.

MARK THOMAS DENNE.